3,627,550
REDUCIBLE VITREOUS MATERIAL
Marc Monneraye, Sait Maur, France, assignor to
U.S. Philips Corporation, New York, N.Y.
No Drawing. Filed Dec. 12, 1969, Ser. No. 884,691
Claims priority, application France, Dec. 30, 1968,
182,085
Int. Cl. C03c *3/04, 3/10, 5/02*
U.S. Cl. 106—53                      1 Claim

ABSTRACT OF THE DISCLOSURE

A reducible vitreous material comprising lead oxide, bismuth oxide, $SiO_2$ and $Al_2O_3$, which after adjustment of the surface conductivity between $10^{11}$ and $10^{13}$ ohms per square by heating in a reducing atmosphere, is particularly suitable for use in a dynode.

---

The invention relates to a range of glass compositions which are particularly suitable for use in a continuous channel dynode. This continuous channel dynode comprises a body having two parallel end boundary surfaces and being provided with a plurality of channels which may be at a right angles to the said end boundary surfaces and are open at both ends. Both end boundary surfaces are coated with an electrically conducting layer and a voltage difference is applied between these layers. Electrons move through the said channels from one end of the dynode to the other end under the influence of the electric field thus obtained.

The secondary emission multiplication in the channels is effected in the following manner. There are comparatively few electrons which travel from one end of a channel to the other without striking the wall. In addition to a forwardly directed velocity component, the other electrons also have a laterally directed velocity component which causes them to strike the wall one or more times when travelling through the channel. In the relevant dynode the walls of the said channels consist of a substance which has the property of being secondary emissive so that an average of more than one electron is released at every impact. In this manner the number of electrons which leaves the electrode is considerably larger than the number of electrons impinging upon the dynode.

To maintain a uniform voltage distribution along the electron paths, sufficient electrons must be supplied by the voltage source to replace the secondary electrons which are removed. The specific resistance of the material must, however, not be so low that a noticeable increase of temperature occurs.

The material of the body may be chosen to be a glass whose specific resistance at room temperature lies between $10^9$ and $10^{12}$ ohm. cm. Alternatively, the walls of the channels may be coated with a thin layer of material having a suitable surface resistance, which material has a secondary emission factor of more than one at the electron velocity resulting from the applied voltage difference.

There are a few known methods of manufacturing a glass body for such a dynode which has a diameter of, for example, 3–10 cm. and a thickness of 1–2.5 mm., and a plurality of apertures of $10^5$ per sq. cm. at a mean diameter of approximately $20\mu$ for each aperture.

The starting point is a glass tube which is drawn out while being heated. The tubes obtained are assembled to form a bundle and the assembly is again drawn out, bundled in a jig and heated until the material of the walls of the tube is connected together and the interstices are filled up by flowing of the material.

Since it is difficult to avoid damaging, deforming or blacking the channels upon drawing out and melting together, the method according to which a core is present in the tube is used as the most attractive embodiment. In addition this technique has the advantage that the bundle can be heated under high pressure so that the tubes are better mutually melted together. After completion of the glass body of the dynode this core is removed. One of the most widely used core materials is thin metal wire, for example, molybdenum wire having a diameter of 20 $\mu$. This wire is covered with a layer of the desired glass by drawing it through a bath of the molten glass, cutting it into pieces after cooling, bundling these pieces and melting the assembly together, and subsequently removing the core chemically. In contrast with the above-mentioned method, drawing operations are not carried out in this method.

A lead-bismuth containing glass is known from United Kingdom patent specification No. 971,733 which glass is recommended for secondary emission electrodes and which, when molten in an oxidising atmosphere, does not have the required level of electric conductivity, but obtains this level by a reducing post-treatment at an elevated temperature. This post-treatment is effected after completion of the glass body, the glass obtaining a surface resistance of between $10^{11}$ and $10^{13}$ ohms per square. Unfortunately, this glass cannot be used on its own, but requires a substrate glass.

The present invention provides a range of glass compositions which, due to their suitable coefficient of expansion, are eminently suitable for use in the above-described technique while using molybdenum wire as a core, and do not require a separate substrate glass. In addition, the desired level of the conductivity can easily be obtained by reducing in a reproducible manner.

The vitreous material according to the invention is characterized in that it has a composition within the following range in mol percent and corresponds approximately to the range in percent by weight mentioned next thereto.

|                | Mol percent | Percent by weight |
|---|---|---|
| $SiO_2$ | 51–73.5 | 35–50 |
| $B_2O_3$ | 0–15 | 0–10 |
| $Al_2O_3$ | 1–3 | 1–3.3 |
| $Na_2O$ | 3–4.9 | 2–4 |
| $K_2O$ | 0–3.6 | 0–4 |
| $CaO+SrO+MgO$ | 0–8.5 | 0–6 |
| $ZnO$ | 6–7 | 5–6.5 |
| $PbO$ | 10.5–12 | 25–30 |
| $Bi_2O_3$ | 2–2.5 | 10–12 |

Some embodiments of the present invention will now be described with reference to the table which gives two glasses according to the invention together with their thermal coefficients of expansion $\lambda$ between 20 and 320° C. and their surface resistance $\chi$ in ohms per square after a reducing treatment for 2 hours at 350° C. in an atmosphere of dry hydrogen. The glass melts are obtained while starting from the relevant oxides or compounds which provide an oxide upon heating. In addition 0.1–0.5% of arsenous and/or antimony oxide is added as a refining agent.

Molybdenum wire having a thickness of 20 $\mu$ and surrounded by a tube of one of these glasses was passed through a vertical furnace, the wire being displaced at a faster speed than the tube. Just before emerging from the furnace, the two were sealed, the glass layer obtaining a thickness of 20 $\mu$. The coated wire was wound on a drum provided with slots. The wire reel was subsequently cut through the slots. The fibres obtained were bundled, placed in a jig and were subsequently heated under pressure until the fibres had melted together and the interstices had been filled up. The bundles were sawn into plates having a thickness of 1.5 mm.

The molybdenum wires were subsequently electrolytically dissolved in a weak alkaline bath containing ammonia and sodium hypochlorite, using a working voltage of 6 volts, and reversing the current direction every 10 seconds. Subsequently, the glass body obtained was thoroughly rinsed, dried, heated in a hydrogen atmosphere and finally provided with metal coatings on both ends by means of vapour deposition.

TABLE

|  | 1 | | 2 | |
| --- | --- | --- | --- | --- |
|  | Mol percent | Percent by weight | Mol percent | Percent by weight |
| $SiO_2$ | 55.3 | 36.8 | 73.3 | 49.6 |
| $B_2O_3$ | 10.4 | 8.0 | | |
| $Al_2O_3$ | 2.9 | 3.3 | 1.1 | 1.2 |
| $Na_2O$ | 4.9 | 3.4 | 3.0 | 2.1 |
| $K_2O$ | | | 3.4 | 3.6 |
| $CaO$ | 6.6 | 4.1 | | |
| $ZnO$ | 6.6 | 5.9 | 6.4 | 5.7 |
| $PbO$ | 11.2 | 27.7 | 10.8 | 27.2 |
| $Bi_2O_3$ | 2.1 | 10.8 | 2.0 | 10.5 |
| $\lambda$ | $62 \times 10^{-7}/°C$ | | $65 \times 10^{-7}/°C$ | |
| $x$ | $10^{12}$ | | $4 \times 10^{11}$ | |

What is claimed is:

1. A reducible vitreous material comprising lead oxide, bismuth oxide, $SiO_2$ and $Al_2O_3$, which after adjustment of the surface conductivity between $10^{11}$ and $10^{13}$ ohms per square by heating in a reducing atmosphere, is particularly suitable for use in a dynode, and consisting essentially of a composition within the range limited as follows in mol. percent, and corresponding approximately to the range in percent by weight, mentioned next thereto

|  | Mol percent | Percent by weight |
| --- | --- | --- |
| $SiO_2$ | 51–73.5 | 35–50 |
| $B_2O_3$ | 0–15 | 0–10 |
| $Al_2O_3$ | 1–3 | 1–3.5 |
| $Na_2O$ | 3–4.9 | 2–4 |
| $K_2O$ | 0–3.5 | 0–4 |
| $CaO+SrO+MgO$ | 0–8.5 | 0–6 |
| $ZnO$ | 6–7 | 5–6.5 |
| $PbO$ | 10.5–12 | 25–30 |
| $Bi_2O_3$ | 2–2.5 | 10–12 |

References Cited

UNITED STATES PATENTS 3,156,577  11/1964  Upton et al. _____ 106—53 X
3,470,002  9/1969  DiMarcello et al. ___ 106—53 X JAMES E. POER, Primary Examiner M. L. BELL, Assistant Examiner U.S. Cl. X.R.
106—49